May 19, 1970     W. T. MILLER     3,512,729
FISHING REEL WITH ELECTRIC WINDING MEANS
Filed Sept. 12, 1967     2 Sheets-Sheet 1
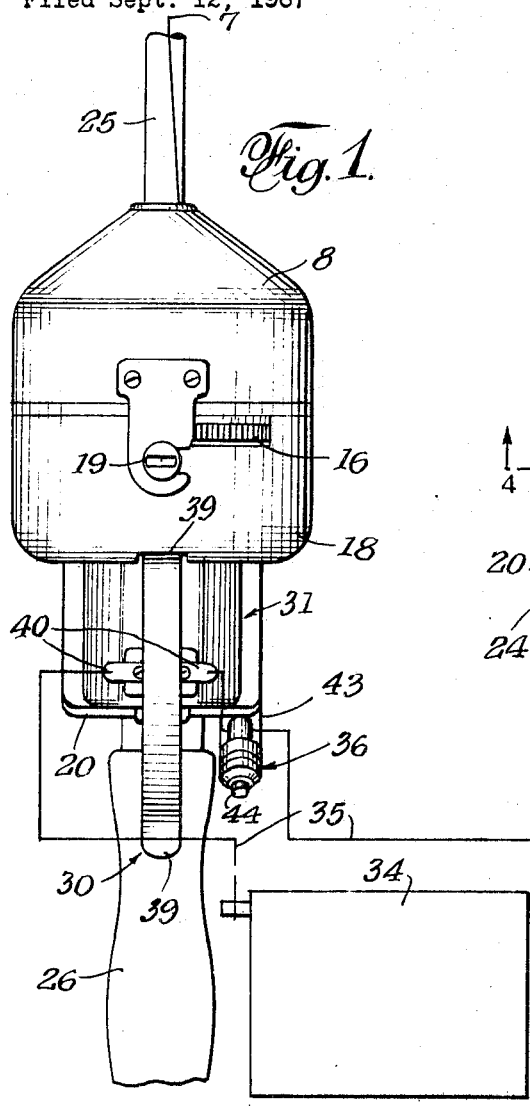
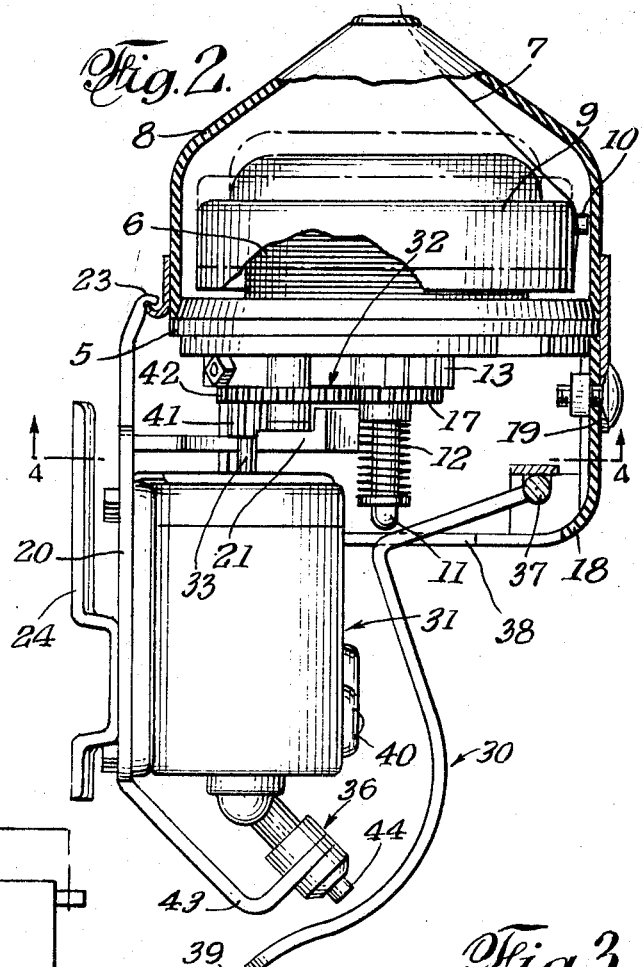
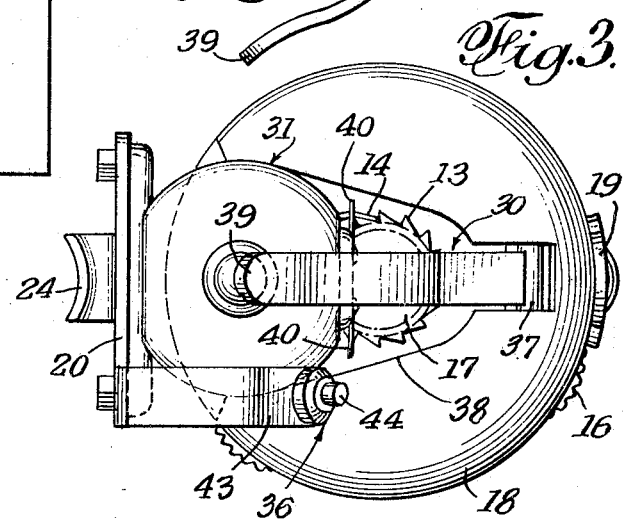
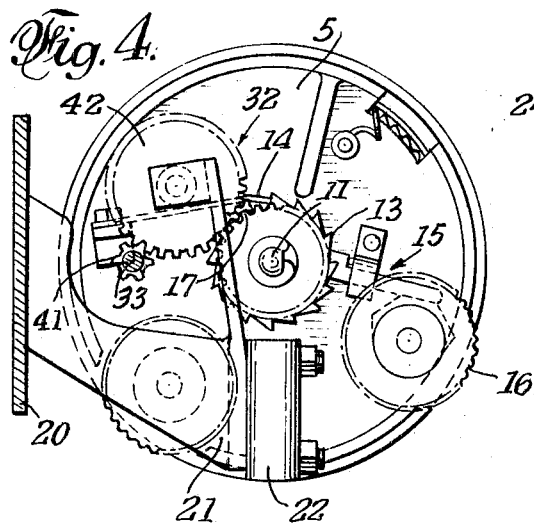
INVENTOR
WILLIAM T. MILLER
BY *C. G. Stratton*
ATTORNEY

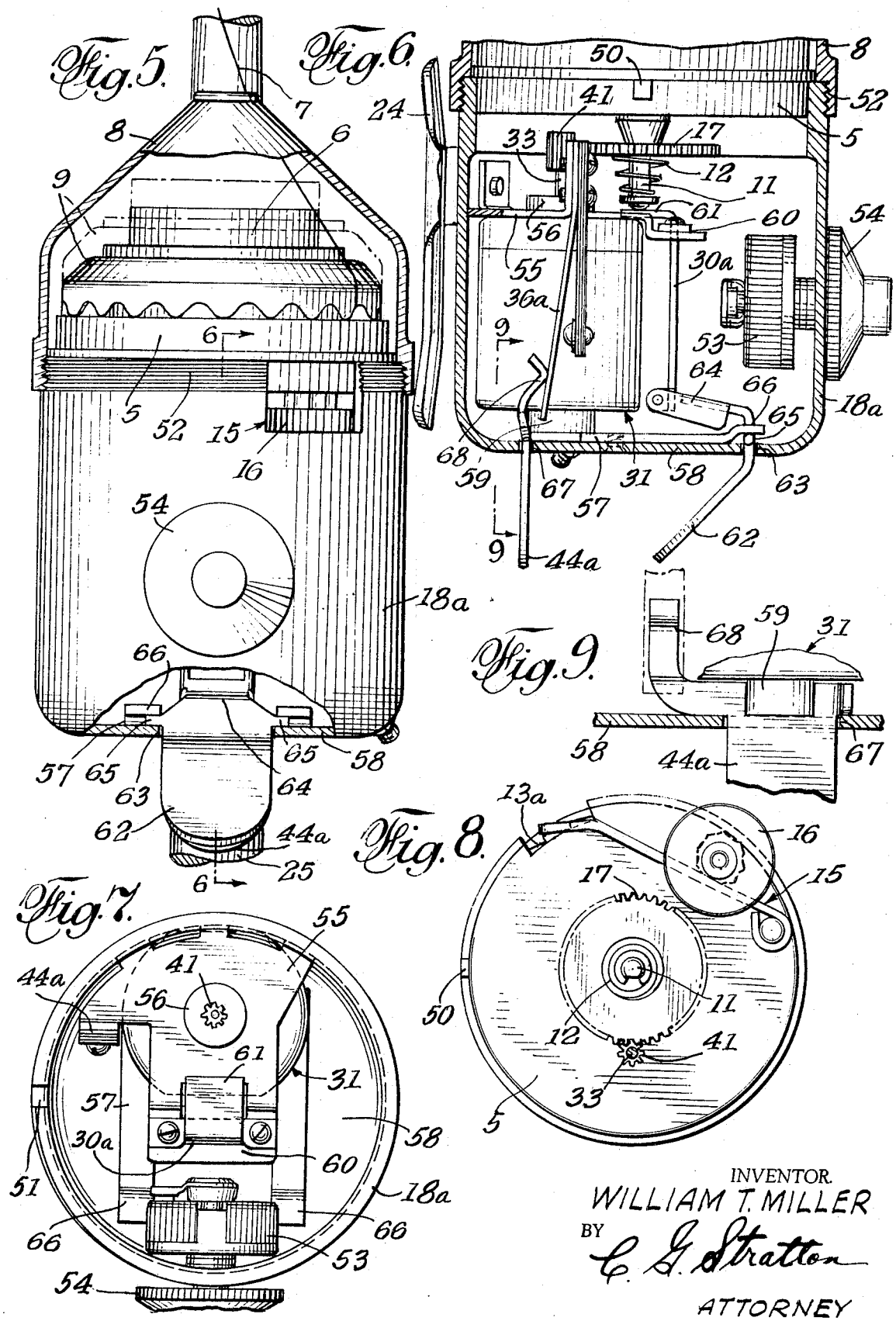

United States Patent Office 3,512,729
Patented May 19, 1970

3,512,729
FISHING REEL WITH ELECTRIC WINDING MEANS
William T. Miller, Parker Star Rte., Box 2502, Blythe, Calif. 92225
Continuation-in-part of application Ser. No. 418,128, Dec. 14, 1964. This application Sept. 12, 1967, Ser. No. 675,276
Int. Cl. A01k 89/00
U.S. Cl. 242—84.2                    3 Claims

ABSTRACT OF THE DISCLOSURE

A closed-face spinning reel includes an electric motor geared to rotate a winding head relative to a normally stationary spool. The winding head is located coaxially forward of the spool, within a conical cover of the housing, and on a shaft slidable between forward, casting position and a rearward position surrounding the spool for winding. A lever is provided on the rear section of the housing for manipulation by the rod holding hand of the operator to move the slidable shaft and flyer forward for casting; after which, the operator releases the lever and closes a switch to energize the motor to rotate the flyer to wind line around the spool. The speed of the motor can be regulated by a rheostat in the motor circuit.

CROSS-REFERENCE TO RELATED APPLICATION

This application is a continuation-in-part of pending application, Ser. No. 418,128, filed Dec. 14, 1964, and now abandoned.

BACKGROUND OF THE INVENTION

Playing a fish, i.e., "pumping" it in, can be efficiently accomplished if the line is kept taut both when reeling in the fish and when manipulating the rod in a backward and forward motion. The usual crank used for reeling in the line must, necessarily be operated by one hand while the other handles the rod. The present invention has for an object to provide a fishing reel of the character mentioned that is effectively adapted for a one-handed operation, thereby enabling one-handed people to play a fish in the mentioned manner.

Crank-operated reeling is frequently too slow to insure a taut line, since whatever efficiency is obtained thereby is largely influenced by the skill of the fisherman. Another object of the invention is to provide a reel of the character referred to that is controlled by power-operated means set into operation by a push of the thumb of the hand that holds the fishing pole, thereby providing a mode of operation that enables instant change between line payout and line reeling, since both may be controlled by the thumb of the hand manipulating the rod.

A further object of the invention is to provide a fishing reel as characterized that is simply formed for ready separation and reassembly of the spool component and the motor case assembly, thereby enabling in-the-field inexpensive repair and maintenance.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, preferred embodiments of the present invention, which are given by way of illustration or example only.

SUMMARY OF THE INVENTION

The above objects of the invention are realized in a spinner-type reel that is conventional in that the same is provided with a controller for a line wind member that may be retracted by a touch of said controller by the thumb of the hand manipulating the rod on which the reel is mounted, such retraction effecting release of the line so that it can pay out freely when "playing" a fish or when casting; with a dead-dog ratchet that enables the line wind member to turn in line-reeling direction and locks the line wind member against turning in the opposite direction; and such other conventional means, as friction adjustment of the line spool.

The above conventionally equipped reel is provided with an electric motor connected by gearing to the spindle of the line wind member to drive the latter in a line-reeling direction only; an electric battery physically separate from the reel so the same may be strapped to the fisherman's belt or harness, or set upon the ground or deck of a boat, said battery representing suitable current-supplying means which may be replaced by power from the battery of a fishing boat; and a controller for a switch in the circuit connecting the motor and current source, mounted on the reel in such proximity to the mentioned controller that the desired thumb-controlled, one-handed operation is obtained.

BRIEF DESCRIPTION OF THE DRAWINGS

In the drawings, like reference characters designate similar parts in the several views.

FIG. 1 is a front elevational view of a fishing reel according to one preferred form of the present invention, shown mounted on a fishing pole and connected to a source of current.

FIG. 2 is an enlarged side elevational view thereof, with housing portions in section to show detail.

FIG. 3 is an end elevational view of the reel as seen from the lower end thereof.

FIG. 4 is a cross-sectional view as taken on the plane of line 4—4 of FIG. 2.

FIG. 5 is a front elevational view, with portions of the housing removed, of another preferred form of the invention.

FIG. 6 is a longitudinal sectional view as taken on the line 6—6 of FIG. 5.

FIG. 7 is an end view showing the interior of the motor case assembly of said other preferred form.

FIG. 8 is a view of the inner end of the spool component of the latter form.

FIG. 9 is a cross-sectional view as taken on the line 9—9 of FIG. 6.

DESCRIPTION OF THE PREFERRED EMBODIMENTS

The spinner reel that is illustrated in FIGS. 1 to 4 conventionally comprises a mounting body 5, a spool 6 fixedly mounted on one side of said body and on which is wound a line 7, the end of which extends through an end opening in a conical housing or cover 8. A spinner head 9 within said cover is provided with a stud 10 that is projected, as shown, when the head 9 is rotated so as to wind the line 7 on the fixed spool 6, and is retracted within the periphery of the head 9 to allow free spinning payout of the line.

The body 5 mounts a shaft 11 which extends from the side of said body that is opposite to the side that mounts the spinner head. A spring 12 biases said shaft 11 in a direction to draw the head 9 to the full-line position of FIG. 2. A push on the end of shaft 11 projects said head 9 to the dot-dash-line position—the spin-casting position.

The head 9 is capable of turning only in the direction that reels in the line 7. A ratchet wheel 13 on the shaft 11 is engaged by a dead-dog 14 to prevent rotation in the opposite direction. A tension or drag adjuster or regulator 15, commonly used in such reels, is controlled by a thumb knob 16 to regulate the drag or tension on the head 9.

A gear 17, keyed to the shaft 11, is rotated in the clockwise direction permitted by the ratchet wheel 13 and its dog 14. In prior reels, this rotation is ordinarily effected by means of a handcrank and connecting gearing between the latter and the gear 17. Said crank and gearing are omitted from the present structure. A cover 18 encloses the described means on said opposite side of the body 5, a connector 19 between the covers 8 and 18 holding the latter in position on opposite sides of said body.

The above-described reel is shown as mounted on a plate 20 by means of a bracket 21 affixed to a projection 22 on the body 5. A finger 23 on said plate 20 cooperates with the connector 19 to hold the cover 8 in place. A connector clip 24 on the back of plate 20 is adapted, in the usual manner, to be connected to a fishing rod 25 in close adjacency to the handle 26 of said rod.

In this form of the invention, the improvements comprise, generally, an actuator lever 30 pivotally carried by the cover 18 and disposed in position to engage and push on the end of shaft 11, an electric motor 31 mounted on the plate 20, reducing gearing 32 operatively connecting the output shaft 33 of said motor with the gear 17, a battery 34 or other suitable source of direct current, an electric circuit 35 connecting said battery and motor, and a normally-open pushbutton switch 36 in said circuit carried by the plate 20 in such close adjacency to the lever 30 as to enable the same thumb or finger of the hand grasping the rod handle 26 to push on either the lever 30 or the button 44 of switch 36, as required, in a fish-playing operation.

The lever 30 is shown as mounted on a pivot 37 and extends through an opening 38 in the bottom of the cover 18. The same has an end 39 that is above and partly overlaps the rod handle 26, as in FIG. 1, so that said end may be comfortably reached and pressed by the thumb, for instance, of the hand grasping the handle.

The motor 31 has its output shaft 33 directed toward the body 5 and is provided with terminals 40 on the end thereof remote from said shaft.

The reducing gearing 32 is shown as a pinion 41 on the motor shaft 33, and optionally includes a gear 42 that interconnects the gear 17 with said pinion 41. It will be clear that the shaft 11 is slower than the motor speed, the gearing ratio used determining the take-up speed of the head 9 and its stud 10.

The power source 34 and the motor terminals 40 are connected in series with the switch 36 by said circuit 35, said switch being carried by a bracket 43 which extends downwardly from the plate 20.

As seen in FIGS. 1, 2 and 3, the handle end 39 and the button 44 of the switch 36 are in such close relationship that it is a simple maneuver to shift the thumb between said handle end 39 and said switch button 44 to control the tautness of a fish line, as desired, when playing a fish.

The form of the invention shown in FIGS. 5, 6 and 7 conventionally comprises a body 5, a spool 6, a line 7, a cover 8, a spinner head 9, a shaft 11, and a spring 12, similar to the similarly designated elements of the earlier-described embodiment.

The drag adjuster 15 and its knob 16, while of somewhat different design, similarly regulate the drag on the head 9. The main gear 17 is similar to the similarly designated gear of the earlier embodiment but in this case is directly engaged with the pinion 41 on the output shaft 33 of the motor 31. Also, the drag adjuster is engaged with a ratchet wheel 13a that is directly affixed to the spool 6 and not to the shaft 11, as in FIG. 4.

The body 5 of the reel in the second embodiment is fitted into a housing or cover 18a and is held non-rotatively by a key 50 engaged in a seat 51 in said cover. The latter and the cover 8 are shown as connected by screw threads 52 and are, therefore, readily separable to give access to the spool assembly and to the inside of the cover 18a.

In this second embodiment, the cover 18a carries and wholly covers the motor 31, encloses the shaft 11, spring 12 and gear 17, and a rheostat 53 which is placed in the circuit 35 that connects said motor to the battery 34 and which has an adjusting knob 54 which adjusts said rheostat to vary the resistance in said circuit and, therefore, the speed of said motor.

As shown best in FIGS. 6 and 7, a bracket 55, that is affixed to the cover 18a, has an opening into which a reduced end 56 of said motor extends, thereby holding said end of the motor in fixed position. A plate 57, affixed to the bottom wall 58 of said cover, has an opening into which a second and opposite reduced end 59 of said motor extends, thereby holding the latter and the motor in fixed position.

The bracket 55 mounts the switch 36a, which is the counterpart of switch 36, and has an extension 60 that constitutes a guide for an actuator member 30a, which is the counterpart of the lever 30. An end 61 on said member 30a is located so as to push on the end of the shaft 11 when said member is moved in an upward direction. The above is effected by a brake and release lever 62 that extends from the bottom wall 58, through a slot 63, and has an inner end 64 pivotally connected to the lower end of the member 30a. Trunnions 65 on said lever 62 form a pivot confined between said wall 58 and ends 66. Thus, when the lever 62 is pressed in a direction toward the bottom 58, the member 30a will be pro-projected, causing the end 61 thereof to push on the end of shaft 11 to shift the spinner head 9 to the dot-dash-line spinner position of FIG. 5.

The switch 36a is normally open, as shown in FIG. 6. A rewind lever 44a, the counterpart of the button 44, extends from the cover 18a through a slot 67 in the cover wall 58. Said lever 44a has a pivotal mount similar to lever 62, but is retained against inward displacement by the lower end of the motor 31. Upper extension 68 on the lever 44a closes switch 36a when pushed by the thumb toward the rod that is connected to the connector clip 24.

While the foregoing has illustrated and described what are now contemplated to be the best modes of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A spinner reel for mounting on a fishing rod having a handle, comprising, in combination:
   (a) a spinner assembly having a body fixedly mounting a fishing line spool on one side of said body with a spinner head engaged over the spool and provided with a spring-biased shaft that is affixed to the spinner head and extends through the body to the opposite side thereof, and a gear keyed to said shaft and disposed on the latter side of the body,
   (b) a conical cover housing said spinner assembly and having an end opening to pass the fishing line reeled on or off said spool,
   (c) a second housing having a bottom closure wall and separably joined to the first housing and into which the mentioned shaft extends and in which the mentioned gear resides, (d) a line-rewind electric motor disposed wholly within the second housing and having a driven shaft with a pinion gear in driving mesh with the gear on the spinner head, (e) a normally-open switch in electric circuit with the motor, also entirely disposed within said second housing, (f) a lever extending through said wall of the second housing and having an outer thumb-engageable end and an inner switch-closing end, (g) said lever being pivotally mounted on said housing wall, and (h) means to depress the shaft against its bias to move the spinner head from line-winding to spinning position, (i) the latter means comprising:
   (1) a guided member having an end directed to engage the end of the spring-biased shaft, and
   (2) a second lever extending through said wall of the second housing and having an outer thumb-engageable end and an inner end pivotally engaged with the opposite end of the guided member to move the latter in a shaft-depressing direction,
   (3) said latter lever being pivotally engaged with said housing wall, and (j) the spinner reel being provided with a bracket affixed to the inside of the latter housing, said bracket having
   (1) a motor-engaging portion,
   (2) a switch-mounting portion, and
   (3) a guiding portion to guide the mentioned shaft-depressing member.

2. A spinner reel according to claim 1, provided with a plate affixed to the inner side of the bottom wall of the second housing, said plate having a motor-engaging portion to cooperate with the motor-engaging portion on the mentioned bracket.

3. A spinner reel according to claim 2, in which said plate has an extension portion formed to engage trunnions on the second lever and cooperate with adjacent portions of said bottom wall to pivotally engage said trunnions.

References Cited

UNITED STATES PATENTS

| | | |
|---|---|---|
| 2,911,165 | 11/1959 | Sarah. |
| 3,030,046 | 4/1962 | Moghadam. |
| 3,069,109 | 12/1962 | Golec. |
| 3,105,651 | 10/1963 | Hull. |
| 3,248,819 | 5/1966 | Stealy. |

FOREIGN PATENTS 368,033    6/1961    Japan.

BILLY S. TAYLOR, Primary Examiner

U.S. Cl. X.R.

242—84.1